H. F. CLARK.
ART OF DRAWING GLASS.
APPLICATION FILED AUG. 2, 1909.

1,044,139.

Patented Nov. 12, 1912.

WITNESSES

INVENTOR
H. F. Clark,

UNITED STATES PATENT OFFICE.

HENRY F. CLARK, OF JEANNETTE, PENNSYLVANIA, ASSIGNOR TO WINDOW GLASS MACHINE COMPANY, OF PITTSBURGH, PENNSYLVANIA, A CORPORATION OF NEW JERSEY.

ART OF DRAWING GLASS.

1,044,139.  Specification of Letters Patent.  Patented Nov. 12, 1912.

Application filed August 2, 1909. Serial No. 510,695.

*To all whom it may concern:*

Be it known that I, HENRY F. CLARK, of Jeannette, Westmoreland county, Pennsylvania, have invented a new and useful Improvement in the Art of Drawing Glass, of which the following is a full, clear, and exact description, reference being had to the accompanying drawings, forming part of this specification, in which—

Figure 1:
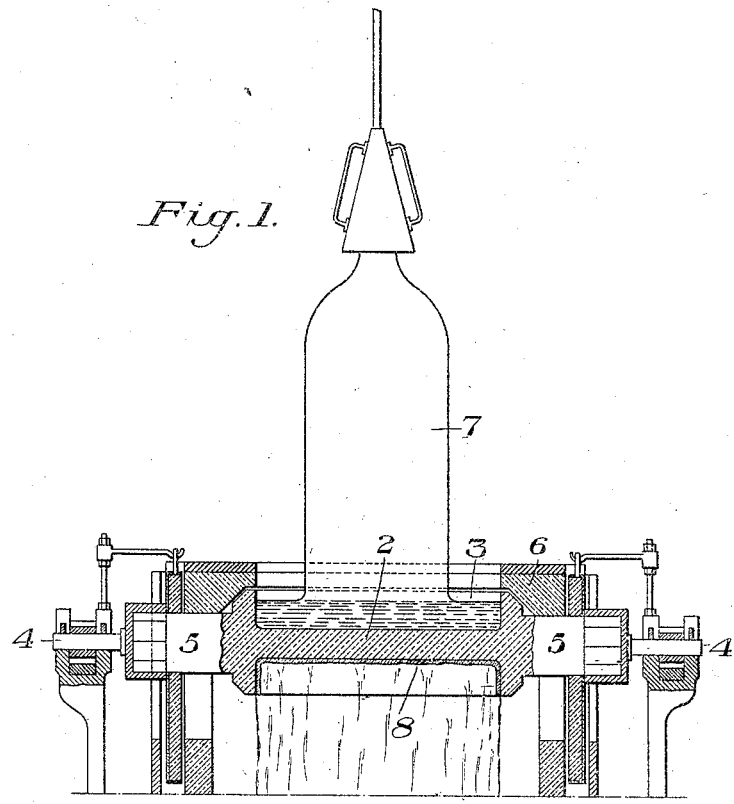
Figure 2:
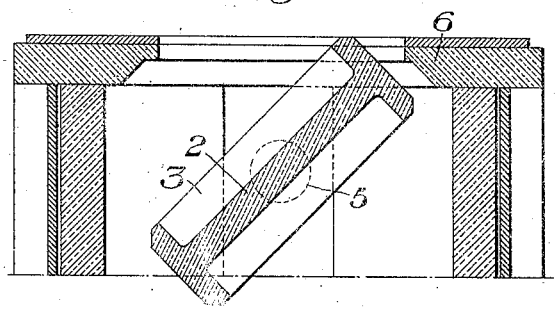

Figures 1 and 2 are vertical sections of glass-drawing apparatus and illustrating the practice of my invention.

My invention has relation to an improvement in the art of drawing glass.

Heretofore difficulty has been experienced in many cases by reason of the presence of bubbles or blisters in the glass in the drawing pots, thereby producing defects in the glass articles drawn therefrom. Many attempts have been made to discover the cause giving rise to the presence of these bubbles or blisters and to overcome the same, but in so far as I am aware, prior to my invention such attempts have not been wholly successful. I have discovered that the presence of these bubbles or blisters is due in a large measure to the fact that the residue of glass left in the pot from a preceding drawing operation, has not, in the methods of operation as heretofore practised, been thoroughly removed before the pot was again filled; but that small globules or buttons of this residue of glass adhered to the bottom of the pot, notwithstanding the attempts made to remove the same, and that it is these globules or buttons which give rise to bubbles or blisters in the glass in the pots when refilled.

In draining the pots after each drawing operation, it has been customary to hold them in substantially horizontal position, and to apply heat thereto for the purpose of melting out the residue of glass. This method, however, does not entirely remove the glass, but, as above stated, small buttons or globules adhere to the walls of the pot.

In accordance with my invention, after each drawing operation I incline the pot to a substantial angle, say an angle of about 45 degrees, at the same time applying heat thereto. By holding the pot for a short interval in this position to complete its draining, I have discovered that substantially all the residue glass will run off, and that the adhering buttons or globules may be avoided.

In the accompanying drawings, I have illustrated the practice of my invention in connection with a double reversible drawing pot of a well known type. In these drawings, the numeral 2 designates the reversible pot having a glass-receiving cavity 3 in each side thereof, and which is rotatably supported by the trunnion members 4 and 5. 6 designates the usual top stone.

7, in Fig. 1, designates a hollow glass cylinder, which is being drawn from the glass contained in the upper cavity of the pot. During this drawing operation, heat is applied to the lower cavity for the purpose of melting out the residue indicated at 8, as shown in Fig. 1.

In accordance with my invention, after the completion of each drawing operation, during which time the residue glass in the lower cavity of the pot is being melted and partially drained out, I tip the pot to an inclined position, such as shown in Fig. 2, and hold it there for a short interval. In this position, all remaining glass in the lower cavity of the pot will drain off, and the retention of globules or buttons of the glass on the walls of the pot is prevented. After this draining operation, the pot is completely reversed and another drawing operation commenced. In this way, I am enabled to effect a great saving in losses due to the of the pot being meanwhile heated and partially drained.

By the simple expedient described, I am enabled to avoid the difficulties in glass drawing above pointed out, and thereby effect a great saving in losses due to the drawing of imperfect articles.

What I claim is:—

1. In the art of glass drawing, the method of operating reversible pots, consisting in drawing an article upwardly from the bath of glass in one receptacle in the pot, simultaneously applying heat to and melting out the refuse glass from the inverted receptacle, moving the pot into a horizontally inclined position after the draw, and continuing the application of heat to the inverted receptacle to remove the buttons or portions of glass remaining therein; substantially as described.

2. In the art of glass drawing, the method of operating reversible pots, consisting in drawing an article upwardly from the bath of glass in one receptacle in the pot, simultaneously applying heat to and melting out the refuse glass from the inverted receptacle, moving the pot into a horizontally inclined position after the draw, continuing the application of heat to the inverted receptacle to remove the buttons or portions of glass remaining therein, and then reversing the pot and supplying a fresh bath of molten glass in the melted out receptacle; substantially as described.

In testimony whereof, I have hereunto set my hand.

HENRY F. CLARK.

Witnesses:
H. M. CORWIN,
GEO. H. PARMELEE.